(12) United States Patent
Snels

(10) Patent No.: US 10,596,506 B2
(45) Date of Patent: Mar. 24, 2020

(54) OIL SEPARATOR

(71) Applicant: ATLAS COPCO AIRPOWER, NAAMLOZE VENNOOTSCHAP, Wilrijk (BE)

(72) Inventor: Guy L. A. Snels, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 339 days.

(21) Appl. No.: 15/521,825

(22) PCT Filed: Oct. 29, 2014

(86) PCT No.: PCT/BE2014/000059
§ 371 (c)(1),
(2) Date: Apr. 25, 2017

(87) PCT Pub. No.: WO2016/065432
PCT Pub. Date: May 6, 2016

(65) Prior Publication Data
US 2017/0246574 A1    Aug. 31, 2017

(30) Foreign Application Priority Data
Oct. 29, 2014 (BE) .................... 2014/5038

(51) Int. Cl.
*B01D 46/00* (2006.01)
*B01D 46/42* (2006.01)

(52) U.S. Cl.
CPC ..... *B01D 46/0031* (2013.01); *B01D 46/4209* (2013.01); *B01D 46/0043* (2013.01); *B01D 2201/50* (2013.01)

(58) Field of Classification Search
CPC ............... B01D 19/0057; B01D 45/12; B01D 46/0031; B01D 46/0043; B01D 46/4209;
(Continued)

(56) References Cited

U.S. PATENT DOCUMENTS 3,364,658 A    1/1968  Walker
8,123,831 B2   2/2012  Heikamp
(Continued)

FOREIGN PATENT DOCUMENTS

DE          1134045 B     8/1962
DE     202006019003 U1    5/2008
(Continued)

OTHER PUBLICATIONS

Full English translation of FR 788702 (Year: 2019).*
(Continued)

*Primary Examiner* — Cabrena Holecek
(74) *Attorney, Agent, or Firm* — Bacon & Thomas, PLLC

(57) ABSTRACT

An oil separator providing a housing with an inlet for an oil-gas mixture and which defines a space that is closed off my means of a lid, whereby a screen is provided in the aforementioned space in which a filter element is provided and a pipe or collector that connects the interior of the filter element to an outlet in the housing for purified gas, whereby this filter element has a lid and a bottom for collecting oil that has been filtered out, whereby a drainage line is provided for the removal of the oil that has been filtered out, wherein the pipe or collector runs to the lid of the filter element and is connected thereto by means of an electrically conductive connecting element, whereby the sidewall of the pipe or collector is provided with at least one opening for the removal of purified gas.

11 Claims, 3 Drawing Sheets

(58) Field of Classification Search
CPC ... B01D 50/002; B01D 2201/50; F04C 18/16; F04C 29/026
See application file for complete search history.

(56) References Cited

U.S. PATENT DOCUMENTS 8,303,264 B2 * 11/2012 Daniels ................... F04C 28/08
                    417/298
8,945,257 B2    2/2015 Moens

FOREIGN PATENT DOCUMENTS

| EP | 0336398 A2 | | 10/1989 | |
|---|---|---|---|---|
| FR | 788702 A | * | 10/1935 | ......... B01D 46/0031 |
| FR | 788702 A | | 10/1935 | |
| FR | 1303754 A | | 9/1962 | |
| JP | H07-308533 A | | 11/1995 | |
| WO | 2010/124349 A1 | | 11/2010 | |

OTHER PUBLICATIONS

Translation of FR 788702 (Year: 2019).*
International Search Report (ISR) dated Jul. 14, 2015, for PCT/BE2014/000059.

* cited by examiner

OIL SEPARATOR

The present invention relates to an oil separator.

More specifically, the invention concerns an oil separator that is provided with a housing with an inlet for an oil-gas mixture and which defines a space that is closed off by means of a lid, whereby the aforementioned space is provided with a screen in which a filter element is a affixed and a pipe or collector that connects the interior of the filter element to an outlet in the housing for purified gas, whereby this filter element has a lid and a bottom for collecting the oil that has been filtered out, whereby a drainage line is provided for draining off the oil that has been filtered out.

BACKGROUND OF THE INVENTION

Such oil separators are already used in oil-injected compressors, whereby the oil-gas mixture leaving the outlet of the compressor element is guided to the oil separator before being guided to consumers of compressed gas for example.

In the oil separator the oil-gas mixture to be treated is brought into the space between the screen and the housing via the inlet in the housing, in which pace the oil-gas mixture will flow so that a first separation phase takes place.

Then the oil-gas mixture will undergo a second separation phase when the oil-gas mixture is forced to flow around the end of the screen to the space enclosed by the screen and thus to change direction in this way.

The separated oil will be collected in the housing of the oil separator at the bottom thereof.

The oil-gas mixture will subsequently flow through the filter element, whereby the oil-gas mixture will finally arrive in the interior of the filter element.

The filter element can consist of a casing that is provided with a suitable filter material that is closed off by the lid of the housing and a bottom. In other words the filter element is attached to the lid of the housing to ensure that the filter element is firmly fastened in the housing of the oil separator.

When flowing through the filter element, a third separation phase takes place, whereby the separated oil is collected in the bottom.

The thus purified gas is brought from the inside to the outlet in the housing via the pipe of collector, where it is guided to consumers of compressed gas.

The filter element of the separator can be replaced for maintenance by removing the lid on the top of the oil separator.

Because in the known oil separators the filter element is attached to the lid of the housing, the removal and refitting of this lid is a delicate operation that comes with a risk of damaging or misplacement of the filter element.

It is known that the gas that flows around in the oil separator can generate static electricity, such that parts in the housing can become statically changed.

An insulated part that is charged can discharge at a certain time, whereby this discharge is coupled with a spark.

This spark can cause an explosion, which can cause severe damage to the machine and can also mean a serious danger for bystanders.

In the known oil separators the filter element is often insulated from the rest of the oil separator.

This occurs because the filter element forms a separation between the oil-gas mixture outside the filter element, i.e. after the second but before the third separation phase, and the gas in the interior of the filter element after the third phase.

For this reason seals are used, for example between the bottom and the pipe or between the lid and the costing, which seals are made from a non-conductive material such as fluoroelastomer (FKM), polytetrafluoroethylene (PTFE), nitrile butadiene rubber (NBR).

As a result the filter element is insulated from the rest of the oil separator. Consequently there is a risk that the filter element will become statically charged during use.

SUMMARY OF THE INVENTION

The purpose of the present invention is to provide a solution to at least one of the aforementioned and/or other disadvantages.

The object of the present invention is an oil separator that is provided with a housing with an inlet for a oil-gas mixture and which defines a space that is closed off by means of a lid, whereby a screen is provided in the aforementioned space in which a filter element is affixed and a pipe or collector that connects the interior of the filter element to an outlet in the housing for purified gas, whereby this filter element has a lid and a bottom for collecting the oil that has been filtered out, whereby a drainage line is provided for draining off the oil that has been filtered out, whereby the pipe or collector runs up to the lid of the filter element and is connected thereto by means of an electrically conductive connecting element, whereby the sidewall of the pipe or collector is provided with at last one opening for the removal of purified gas.

An advantage is that the electrostatic charge that can accumulate in the filter element can be removed via the pipe or collector by means of such an electrically conductive connecting element.

The pipe or collector is electrically connected to the housing of the oil separator for example, which in turn is connected to earth.

In this way any static electricity that is accumulated in the filter element is efficiently removed via the pipe or collector and the housing.

In so doing an electric discharge with a spark, and the accompanying explosion hazard, is prevented.

In a practical embodiment that connection between the filter element and the drainage line comprises two parts, i.e. a first part that forms the bottom of the filter element and a second part that is connected to the pipe or collector and acts as a support for the filter element, whereby said two parts fit together such that the interior of the filter element is closed off, whereby the electrically conductive connecting element will be able to ensure that the filter element is held or pushed against the second part so that a good closure between the two parts is obtained.

An advantage thereof is that the connecting element will also ensure a good closure between the two parts, such that no unfiltered oil-gas mixture can get into the interior of the filter element.

Moreover the filter element will be kept, firmly in place in the housing on the support of the pipe.

As a result it is no longer required to attach the filter element to the lid of the housing in order to keep the filter element in its place.

BRIEF DESCRIPTION OF THE DRAWINGS

With the intention of better showing the characteristics of the invention, some preferred embodiments of an oil separator according to the invention are described hereafter by way of an example, without any limiting nature, with reference to the accompanying drawings, wherein.

DETAILED DESCRIPTION OF THE INVENTION

Figure 1:
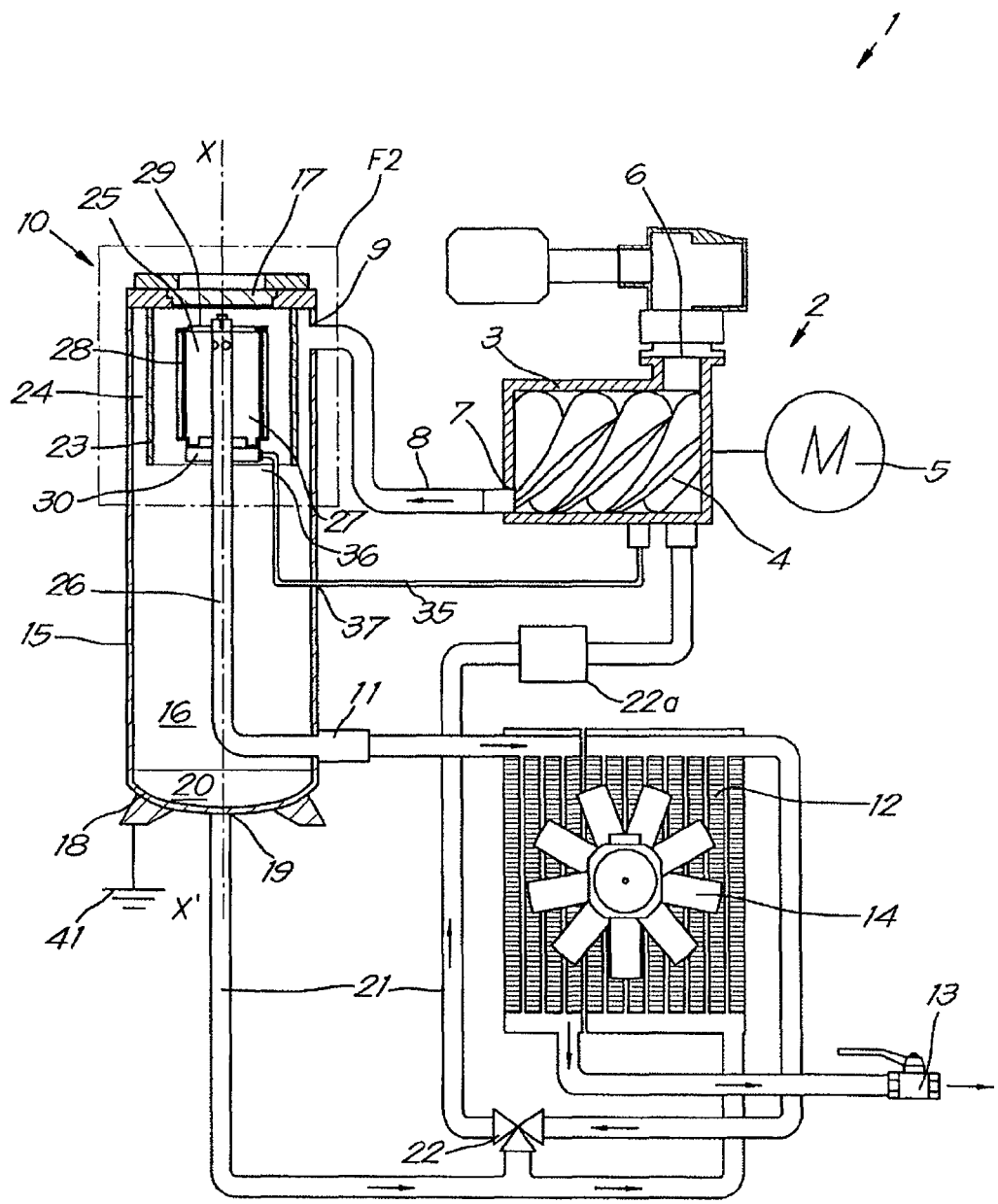
FIG. 1 schematically shows a compressor device with on oil separator according to the invention.

The compressor device 1 shown in FIG. 1 comprises an oil-injected compressor element 2, in this case of the known screw type with a housing 3 in which two meshed helical rotors 4 are driven by a motor 5.

It is clear that the compressor element 2 can also by of another type without departing from the scope of the invention, such as for example a turbocompressor element, a tooth compressor element, a scroll compressor element or any other compressor type.

The housing 3 is provided with an inlet 6 for the supply of a gas to be compressed, such as air or another gas or mixture of gases.

The housing 3 is further provided with an outlet 7 that is connected to an outlet pipe 8. This outlet pipe 8 is connected to the inlet 9 of an oil separator 10. This inlet 9 has been placed tangentially.

The outlet 11 for purified gas from the oil separator 10 can be connected directly to a downstream consumer network 13, or via a cooler 12 that will cool the gas before being guided to the consumer network 13 for the supply of various pneumatic tools or similar that are not shown here.

In this case the cooler 12 is provided with a fan 14 to provide cooling, although it is not excluded that instead of using cooling air for the cooling, a liquid coolant is used that is guided through the cooler by means of a pump.

In this case, but not necessarily, the oil separator 10 is provided with a cylindrical housing 15 that defines a space 16 in this example that is closed of at the top by means of a lid 17 and which in this case has a drain opening 19 on the underside 18 of the housing 15 for the removal of separated oil 20 that has collected at the bottom of the housing.

A pipe 21 extends from this drain opening 19 that carries the oil 20 back to the compressor element 2, where the oil 20 is injected. Here the pipe 21 passes through the cooler 12 to cool the oil 20.

A three-way valve 22 is provided in the pipe 21 to at least be able to partially bypass the cooler 12, if desired, so that oil 20 can be guided directly to the compressor element 2 without passing along the cooler.

An oil filter 22a is also provided in the pipe 21, downstream from the three-way valve 22.

In the aforementioned space 16 defined by the housing 15, there is a screen 23 in the form of a tube 23, which, in the example shown, but not necessarily, extends from the lid 17 to a distance from the underside 18 of the housing 15. In this case this tube 23 extends in the axial direction X-X' from the housing 15 and such that there is still an open space, hereinafter termed the inlet zone 24, between the tube 23 and the housing 15.

In the screen or the tube 23, i.e. in the space enclosed by the wall of the screen 23, a filter element 25 is affixed and a collector or pipe 26 that connects the interior 27 of the filter element 25 to the aforementioned outlet 11 for purified gas.

The filter element 25 is affixed around the collector 26 as it were.

Figure 2:
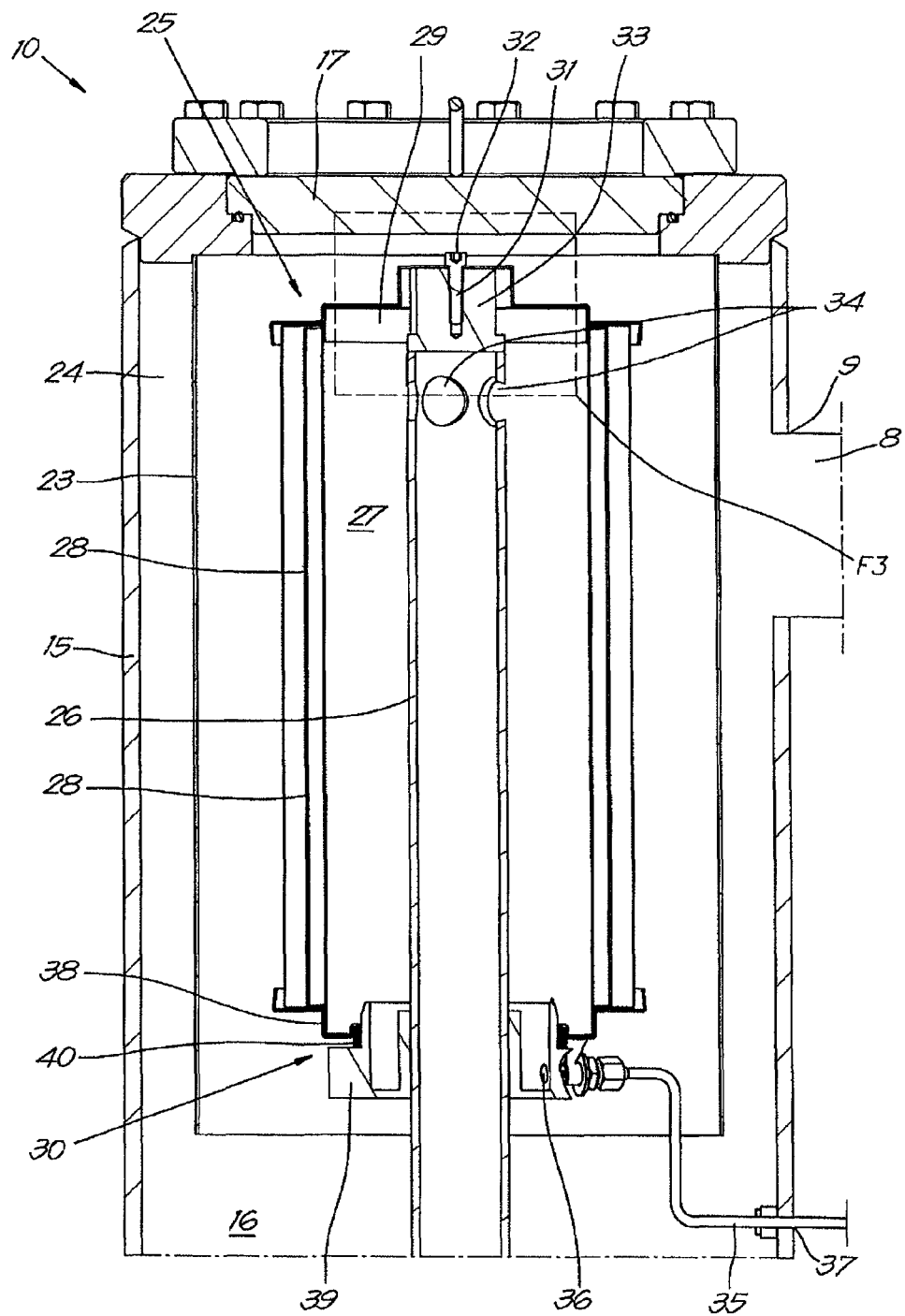
FIG. 2 shows in more detail the section indicated by F2 in FIG. 1.

FIG. 2 shows the filter element 25 in more detail.

In the example shown the axis of the housing 15, the axis of the tube 23 and the axis of the pipe 26 are parallel and coincident, or at least as good as coincident. It is clear that this does not necessarily have to be the case.

The filter element 25 has a casing 28 that is provided with a suitable filter material and which in this example is closed off by a lid 29 and a bottom 30. In this case, the lid 29 of the filter element 25 is preferably at some distance from the lid 17 of the housing 15 of the oil separator 10. It is also possible that the lid 29 of the filter element 25 is against the lid 17 of the housing 15. In any case it is preferable that the lid 17 of the housing 15 can be removed independently of the filter element 25.

According to the invention the aforementioned pipe 26 extends up to the lid 29 on the top of the filter element 25, whereby the pipe 26 is connected to the lid 29 by means of an electrically conductive connecting element 31.

In the example shown the connecting element 31 comprises a bolt 32 that connects the lid 29 of the filter element 25 to a coupling 33 affixed on the pipe 26. This bolt 32 can of course also be a screw, nut or similar.

According to the invention the sidewall of the pipe 25 is provided with at least one opening 34 for the removal of purified gas, which in this case and preferably is in the vicinity of the lid 29 of the filter element 25.

The pipe 26 preferably extends through the underside of the filter element 25, more specifically through the bottom 30 of the filter element 25, and under the tube 23 through to the outlet 11 for purified gas.

The oil filtered out will arrive at the bottom 30 of the filter element 25.

In order to be able to remove this oil that has been filtered out, a drainage line 35 is provided, which in this example extends from the underside of the filter element 25, more specifically from an opening 36 in the bottom 30, to an outlet 37 for oil in the housing 15.

In this case the drainage line 35 extends further through the housing 15 and then leads to the compressor element 2, where the removed oil is injected.

Preferably, but not necessarily, the drainage line 35 extends from the aforementioned opening 36 under the tube 23 to the outlet 37 for oil, analogous to the pipe 26.

An advantage of this is that a passage does not have to be provided in the tube 23 for the drainage line 35 or the pipe 26.

In this example, the drainage line 35 is detachably connected to the bottom 30 of the filter element 25 and to the housing 15 of the oil separator.

The connection between the underside of the filter element 25 and the drainage line 35 preferably, but not necessarily, comprises two parts, i.e. a first part 38 that is connected to the filter element 25, more specifically the casing 28, and which in this case acts as the bottom 30 and a second part 39 that is connected to the pipe 26 and acts as a support for the filter element 25. To this end the second part 39 is firmly connected to the pipe 26, but this is not necessarily the case.

It is clear that the first part 38, and thus the bottom 30, can also form part of the filter element 25.

The two 38, 39 fit together such that the interior 27 of the filter element 25 is closed off. In the example shown a sealing ring 40 or similar is provided between the two parts that ensures the airtight closure between the two parts 38, 39. This sealing ring 40 is preferably made of a deformable or elastic material.

The two parts 38, 39 are connected together so that oil collected in the first part 38 can be carried away to the second part 39, whereby the outlet 37 connects to the opening 36 in the second part 39 of the connection between the drainage line 35 and the underside of the filter element 25.

The aforementioned bolt 32 in the lid 29 of the filter element 25 will be able to ensure that the filter element 25 is pressed against the top of the tube 26 with a certain force or pressure, such that a reliable electrical connection comes into being.

The operation of the compressor device 1 is very simple and as follows.

During operation the compressor element 2 will draw in air via the inlet 6 that is then compressed by the helical rotors 4.

Oil will be injected in the compressor element 2 to provide cooling and lubrication for the compressor element 2 and if need by for the sealing between the rotors 4 or between the rotors 4 and the housing 3 of the compressor element 2.

As the outlet 7 of the compressor element 2, a mixture of compressed gas and oil is transported to the inlet 9 of the oil separator 10.

The oil-gas mixture will arrive in the inlet zone 24 between the housing 15 and the tube 23 this inlet 9 where the oil-gas mixture will flow through this inlet zone 24 in a downward direction along and around the tube 23.

As a result of the centrifugal forces the heavier oil particles end up against the walls of the housing 15, whereby these oil particles then flow downwards along the all and are collected at the underside 18 of the housing 15.

In this way a first separation phase takes place.

When the mixture is at the bottom of the inlet zone 24, the oil-gas mixture will flow around the end of the tube 23 and then continue in an upward direction.

The mixture this arrives in the space enclosed by the tube 23.

Because the oil-gas mixture is forced to make a curve of 180 degrees, the heavier oil particles will continue their downward movement as a result of inertia or thus the force of gravity acting thereon.

In this way a second separation phase takes place, whereby the oil particles are also collected at the underside 18 of the housing 20.

The third and last separation phase takes place by the oil-gas mixture being driven upwards from the space enclosed by the tube 23 through the casing 28 of the filter element 25.

The filter material will filter the remaining oil from the gas so that the oil-gas mixture contains almost 99.99% less oil compared to the unpurified mixture.

The oil filtered out will arrive in the bottom 30 via the filter material.

After flowing through the casing 28 the purified gas arrives in the interior 27 of the filter element 25, where it will leave the oil separator 10 via the opening 14 in the pipe 26 and will be transported through the pipe 26 to the outlet 11 for purified gas and then to the cooler 12.

The purified gas can then be used in an application located downstream.

When the gas flows through the casing 28 and in the interior 27 of the filter element 25, it is possible that the filter element 25 becomes electrostatically charged. The bolt 32 in the lid 29 of the filter element 25 provides an electrically conductive path between the filter element 25 and the pipe 26, whereby the pipe 26 is connected to the housing 15, which in turn is connected to earth 41. In so doing the accumulation of electrostatic charge in the filter element 25, and the possible accompanying discharge by a spark, is prevented.

The separated oil that is collected at the underside 18 of the oil separator 10 is carried back to the compressor element 2 via the drain opening 19 and the pipe 21, to be injected there again. This pipe 21 passes via the abovementioned cooler 12 to cool the oil if desired.

Via the three-way valve 22 the quantity of oil that passes via the cooler 12 and the quantity of oil that is guided directly to the compressor element 2 is controlled according to the necessary cooling of the compressor element 2.

The filter oil collected in the bottom 30 or the first part 38 will then arrive in the second part 39.

The filtered oil will be guided away via the drainage line 35 to be injected back into the compressor element 2.

When the filter material is saturated or when maintenance or repair works are required on the filter element 25, the lid 17 of the oil separator 10 will be opened and removed.

Because the drainage line 35 is not connected to the lid 17 of the oil separator 10, this action will not expose the drainage line 35 to damage.

Then the bolt 32 can be unscrewed and the filter element 25 can be taken out of the oil separator 10.

In this case the second part 39 of the lid 30 is left around the pipe 26.

The new, serviced or repaired filter element 25 can then be fitted back, the bolt 32 can be put back, if applicable the drainage line 35 can be reconnected and the lid 17 of the oil separator 10 can be reaffixed.

It should be noted here that during these actions the drainage line 35 does not have to be removed and reinstalled, nor is it at risk, and that when replacing the lid 17 there is no need to ensure that the drainage line 35 is correctly fitted or is not damaged.

Because the lid 29 of the filer element 25 is at some, but nonetheless limited, distance from the lid 17 of the oil separator 10, the fitting of the lid 17 of the oil separator 10 cannot damage the filter element 25 or move it out of position.

Figure 3:
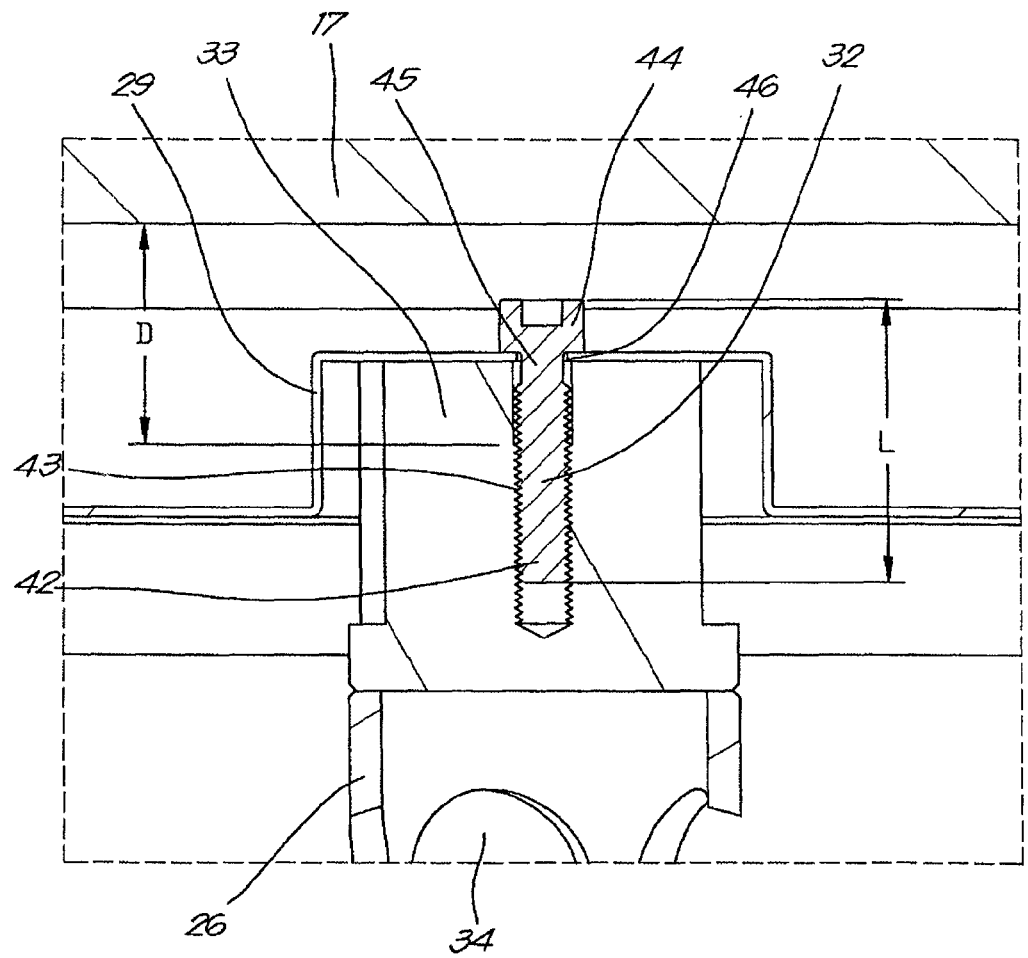
FIG. 3 shows an alternative embodiment of the section indicated by F3 in FIG. 2.

FIG. 3 shows an alternative and preferred embodiment of the bolt 32 in more detail.

The bolt 32 comprises a shaft 42 with a screw thread 43 and a head 44.

The bolt 32 is provided with a narrowing 45 in the shaft 42 that extends from the underside of the head 44 of the bolt 32 to the screw thread 43.

The length of the narrowing 45 is at least equal to the thickness of the lid 29 of the filter element 25.

Because the narrowing 45 is provided in the bolt 32, a smaller passage 46 can be provided in the lid 29 for the bolt 32 and when the bolt 32 is affixed in the lid it can freely turn in the passage 46 in the lid 29.

Moreover, due to the narrowing 45 and the smaller passage in the lid 29, the bolt 32 cannot just fall out of the lid 29, which prevents the bolt 32 getting lost or falling into the oil separator during assembly.

The area of the cross-section of the bolt 32 at the location of the narrowing 45 is at least equal to the tension are of the bolt 32. The tension are is the area of the cross-section of the screw thread that can absorb tensile force. As a result the bolt 32 is not further weakened and a standard tightening torque can be used to fasten the bolt 32.

In this case the length L of the bolt 32 is greater than the distance D between the start of the screw thread in the coupling 33 and the underside of the lid 17 of the housing 15.

This will ensure that it is not possible to fit the lid 17 when the bolt 32 is not tightly screwed in the coupling 33.

In other words: only when it is ensured that the filter element 25 makes an electrical connection to the rest of the oil separator 10 can the lid 17 be placed on the housing 15.

The present invention is by no means limited to the embodiments described as an example and shown in the drawings, but an oil separator according to the invention can be realised in all kinds of forms and dimensions, without departing from the scope of the invention.

The invention claimed is:

1. An oil separator comprising:
   a housing with an inlet for an oil-gas mixture and a space that is closed off by means of a lid,
   a screen provided in the space, said screen having an open end, wherein an inlet zone for the oil-gas mixture is created between the housing and the screen,
   a filter element provided in an inner space enclosed by the screen, said filter element comprises a lid and a bottom for collecting oil that has been filtered out, and
   a pipe or collector that connects an interior of the filter element to an outlet in the housing for purified gas, and
   a drainage line provided at the bottom of the filter element for the removal of the oil that has been filtered out,
   wherein the pipe or collector runs to the lid of the filter element and is connected thereto by means of an electrically conductive connecting element, wherein a sidewall of the pipe or collector is provided with at least one opening for the removal of purified gas, and
   wherein the oil separator is configured in a way such that a flow of the oil-gas mixture is provided through the inlet to the inlet zone and then flows around the open end of the screen to the inner space enclosed by the screen.

2. The oil separator according to claim 1, wherein the pipe or collector extends from the lid of the filter element through the bottom and under the screen to the outlet for purified gas.

3. The oil separator according to claim 1, wherein at least one opening in the sidewall of the pipe or collector is adjacent the lid of the filter element.

4. The oil separator according to claim 1, wherein the lid of the filter element is separated at a distance from the lid of the housing.

5. The oil separator according to claim 1, wherein a connection between the filter element and the drainage line comprises a first part that forms the bottom of the of the filter element, and a second part that is connected to the pipe or collector and which acts as a support for the filter element, whereby these two parts fit together such that an interior of the filter element is closed, whereby the electrically conductive connecting element is able to ensure that the filter element is held or pushed against the second part so that a good closure between the two parts is obtained.

6. The oil separator according to claim 1, wherein the electrically conductive connecting element is selected from the group consisting of a bolt, screw, or nut that connects the lid of the filter element to a coupling provided on the pipe or collector.

7. The oil separator according to claim 6, wherein a length of the bolt, screw, or nut is greater than a distance between the start of a screw thread in the coupling and an underside of the lid of the housing.

8. The oil separator according to claim 6, wherein the bolt, screw, or nut is provided with a narrowing in a shaft that extends from an underside of a head of the bolt, screw, or nut up to a screw thread over a length that is at least equal to a thickness of the lid of the filter element.

9. The oil separator according to claim 8, wherein the aforementioned narrowing is such that an area of a cross-section of the bolt screw, or nut at the location of the narrowing is at least equal to a tension area of the bolt, screw, or nut.

10. An oil separator comprising:
    a housing with an inlet for an oil-gas mixture and defines a space that is closed off by a lid,
    a screen provided in the space, said screen having an open end, wherein an inlet zone for the oil-gas mixture is created between the housing and the screen,
    a filter element provided in an inner space enclosed by the screen, said filter element comprises a lid and a bottom for collecting oil that has been filtered out,
    a pipe or collector that connects an interior of the filter element to an outlet in the housing for purified gas, and
    a drainage line provided at the bottom of the filter element for the removal of the oil that has been filtered out, said drainage line extending from the bottom of the filter element to the housing,
    wherein the pipe or collector runs to the lid of the filter element and is connected to an electrically conductive connecting element, wherein a sidewall of the pipe or collector is provided with at least one opening for the removal of purified gas, and
    wherein the oil separator is configured in a way such that a flow of the oil-gas mixture is provided through the inlet to the inlet zone and then flows around the open end of the screen to the inner space enclosed by the screen.

11. The oil separator according to claim 10, wherein the electrically conductive connecting element is a shaft that connects the lid of the filter element to a coupling provided on the pipe or collector, and wherein the shaft comprises a narrowing that is at least equal to a thickness of the lid of the filter element.

* * * * *